July 7, 1964 J. M. KENDALL 3,140,459
LOW NOISE, LOW LEVEL, PRECISION POTENTIOMETER
Filed July 23, 1963

INVENTOR.
JAMES M. KENDALL
BY R.F. Houfield
R.W. Hicks
ATTYS.

3,140,459
   LOW NOISE, LOW LEVEL, PRECISION
              POTENTIOMETER
James M. Kendall, Pasadena, Calif., assignor to the United
  States of America as represented by the Secretary of the
  Navy
      Filed July 23, 1963, Ser. No. 297,164
           8 Claims.  (Cl. 338—154)
    (Granted under Title 35, U.S. Code (1952), sec. 266)

The invention described herein may be manufactured and used by or for the Government of the United States of America for governmental purposes without the payment of any royalties thereon or therefor.

This invention relates to potentiometer devices and more particularly to a low noise, low level, precision potentiometer for the production and measurement of low level signals in the microvolt range which possessed the characteristics of infinite resolution and freedom from parasitic thermal voltages and the disturbing effects of ambient electromagnetic fields.

Potentiometer devices of this general character heretofore devised may be roughly placed in two categories, the first of which employs a resistance wire with a sliding contact and the other operates by pressing a metallic contact member into variable contact with the surface of a resistor. In the measurement of low level voltages with a high degree of precision, the contact material and resistance wire comprising the sliding type of potentiometer have been found to be not altogether satisfactory as a result of wear caused by the sliding of one surface along the other which is sufficient to generate a small amount of heat thereby producing a thermoelectric couple effect due to the differences in the characteristics of the materials comprising the contact resistance and resistance wire which are employed to reduce wear. Where this thermoelectric couple voltage is of the nature of a spurious signal and therefore causes error in the measurement, the wear limits the life of the device and the sliding action obviously adds friction which must be overcome. With regard to the prior art potentiometer devices in which a contact member is pressed into controllably variable contact with a resistor such, for example, as the electrical resistance device disclosed in Patent 1,704,154 to E. R. Stoekle, in which a flexible contact ring of thin flexible material is bent into firm contact with the resistor in a region directly beneath a roller, certain difficulties have been experienced by small circumferential movement of the ring which tends to work to either one side or the other thus making too much slack on one side and not enough on the other after a few movements of the roller. Such a device is not suited for the precise measurements obtainable by the device herein disclosed which is suitable for measuring very small voltages from strain gages, especially those in pressure transducers, and small voltages from thermocouples in measurement of small temperature differences in the order of one degree centigrade to be measured to an accuracy of one percent and in which the error voltage produced by moving the arm of the potentiometer is reduced to less than 0.01 microvolt.

The device of the present invention possesses all of the advantages of the prior art devices and none of the foregoing disadvantages. This desirable object is achieved by the novel features of construction and arrangement of the parts of the device which will be described in greater detail as the description proceeds.

One of the objects of the present invention is to provide a new and improved potentiometer for accurately measuring low level voltages with a high degree of precision and which is free from noise and spurious voltages due to thermoelectric couple effects.

Another object is to provide a new and improved low noise, low level precision potentiometer in which the spurious voltage due to the coupling with the ambient electromagnetic field is reduced to a minimum.

Still another object is to provide a new and improved low noise, precision potentiometer in which the error voltage produced by moving the arm thereof is less than 0.01 microvolt.

Still other objects, advantages, and improvements will be apparent from a consideration of the following description taken in connection with the annexed drawing of which, FIG. 1 is a plan view of a potentiometer in accordance with a preferred embodiment of the invention;

Figure 1:
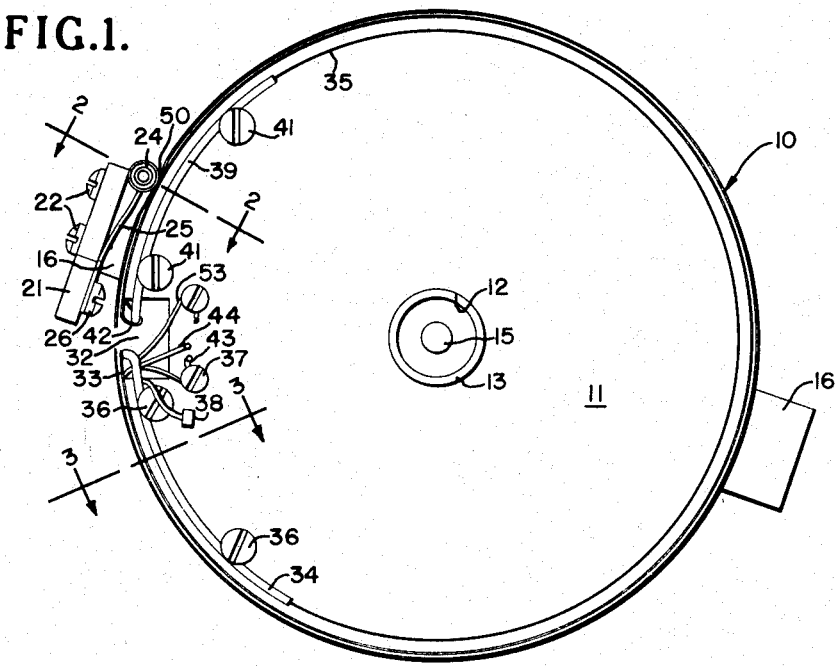

Referring now to the drawing for a more complete understanding of the invention, and more particularly to FIG. 1 thereof, there is shown thereon a potentiometer, indicated generally by the numeral 10, comprising a circular base 11 of disc-like configuration composed of insulating material suitable for the purpose such, for example, as a material known in the trade as linen "Bakelite" and having a circular aperture 12 formed therein concentric with the outer periphery of the base. A sleeve 13 is snugly fitted in aperture 12 and supports a ball bearing 14 secured to shaft 15 by means of which the shaft is supported for rotation about the axis of the base 11, the ball bearing being restrained from axial movement along the length of sleeve 13 by any suitable means such, for example, as by a snap ring arrangement, not shown.

An arm 16, preferably counterbalanced, is mounted on shaft 15 and secured thereto as by screw 17, a washer 18 being disposed between the arm and the base 11 substantially as shown. The shaft is also preferably provided with a knob 19 secured thereto by means of which the arm 16 is moved in either direction to a desired setting. The upper end of arm 16, as viewed in the drawing, has secured thereto a rigid L-shaped member 21 as by the screws 22, the member being composed of suitable insulating material such, for example, as linen "Bakelite." A follower 23 carrying a miniature ball bearing 24 on one end thereof is connected to the member 21 by a length of spring wire 25 preferably of bifurcated configuration secured to the member 21 as by the screws 26, the spring wire being tensioned to exert a force on the bearing 24 sufficient to bias the bearing in a radial direction toward the axis of the circular base substantially as shown.

The outer peripheral surface of the base is configured to a cylindrical portion 27 and a relatively narrow cylindrical portion 28 of slightly greater diameter adjacent thereto. The cylindrical portion 27 is provided with two annular slots 29 and 31 terminating at each end thereof in a recess 32 formed inwardly from the outer surface of the peripheral portion of the base. A length of solid wire 33 of suitable resistance material such, for example, as "Nichrome" or the like, is disposed within the slots 29 and 31, the wire passing from slot 29 to slot 31 by a reverse bend or loop 42 therein disposed with the recess 32. Slot 29, it will be noted, is of a depth less than the diameter of the resistance wire 33 whereby the length of wire within slot 29 extends exteriorly of the surface of the cylindrical portion 27 when the wire is disposed therein. The slot 31, however, has a depth greater than the diameter than the wire such that the wire is disposed beneath the surface of cylindrical portion 27 when the wire is snugly arranged therein, for reasons which will be more clearly apparent as the description proceeds.

Figure 2:
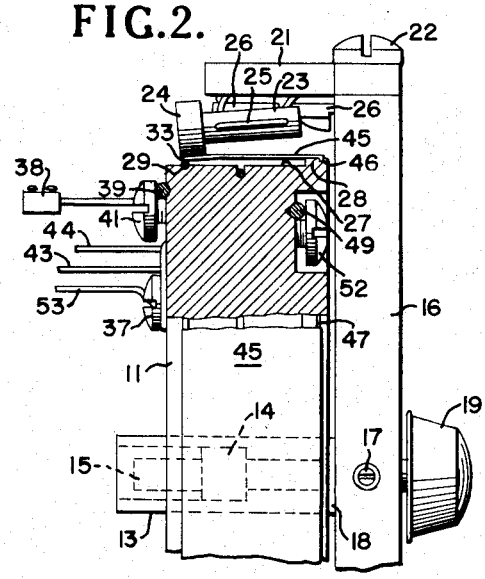
FIG. 2 is a fragmentary view, partly in section, taken substantially along the line 2—2 of FIG. 1.

One end of the length of wire 33 is welded to a length of relatively heavy wire 34 configured substantially as shown for arcuate engagement with a circular groove 35 formed on the base and held clamped thereto by screws 36. The outer end of the wire is clamped to the base by screw 37 and provided with a terminal connection such, for example, as with terminal connection 38 illustrated, FIG. 2. A second length of wire 39 generally similar to the wire 34 is disposed within the slot 35 and retained in an adjusted position therein by screws 41. One end of the wire 39 is formed for engagement with loop 42 of resistance wire 33 extending between slots 31 and 33 in such manner that the resistance wire 33 may be drawn into tight-fitting, snug engagement with slots 29 and 31 by pressure applied to the other end of wire 39 and tightening screws 41 concurrently therewith.

The resistance wire 33 has welded thereto a tap wire 43 at a short distance from the connection between wire 33 and the wire 34 thereby to provide a zero position for the arm 16. A wire 44 welded to the wire 34 near the point of contact thereof with wire 33 is employed to establish an external electrical connection to the end of wire 33 near the zero tap.

Figure 3:
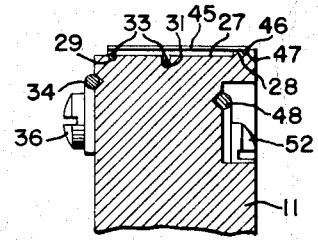
FIG. 3 is a sectional view of the contact elements and supporting means therefor taken along the line 3—3 of FIG. 1.
Figure 4:
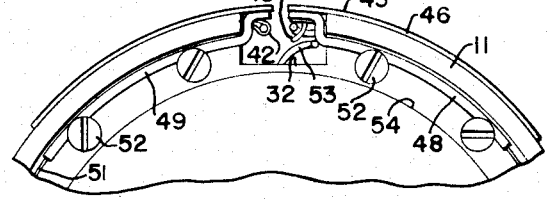
FIG. 4 is a fragmentary view of the opposite side of the device of FIG. 1.

A discontinuous thin flexible metallic band 45 of substantially the same width as the thickness of the base and provided with a small turned-over lip 46 throughout the length thereof, is fitted about the cylindrical portion 28 of the base with the lip 46 engaging the bottom of a circular groove 47 formed therein substantially as shown most clearly on FIG. 3. The band 45 is provided with a pair of heavy wire members 48 and 49 welded to the ends thereof, respectively, and arcuately configured for disposition within a circular groove 51 and securely clamped therein as by the screws 52.

An arrangement is thus provided in which the flexible band 45 is placed continuously under tension with the bottom of lip 46 thereof engaging the bottom of groove 47 uniformly throughout the length of the flexible band. This arrangement is such that the flexible band is closely adjacent to and disengaged from the length of resistance wire 33 protruding from slot 29 except at a point opposite the ball bearing or roller 24 at which point the band is deformed as at 50 such that electrical contact is made between the flexible band and the resistance wire 33. An external electrical connection to the end of the flexible band opposite the zero position of wire 33 is provided by a length of wire 53 welded thereto. The resistance wire 33 and flexible band are both composed of the same material thereby eliminating thermocouple effects which would otherwise be present if the wire and the band were at different temperatures. The screws 52 are disposed within a somewhat wider annular recess 54 formed in the base member 11 and of sufficient depth to prevent the screws from projecting beyond the flat surface thereof.

By providing a thin flexible metallic strip having a rolled-over edge or lip 46 disposed within the groove 47 in the manner disclosed herein, the flexible band is securely anchored to the circular base throughout the length of the band thereby providing an arrangement in which creepage of the flexible band about the periphery of the base as a result of operation of the rollers therealong is prevented and thus there is no possibility of too much slack in the band on one side of the roller and not enough on the opposite side after a few movements of the roller thereon as in devices of this type heretofore devised. Furthermore, by providing a structure in which the areas enclosed by the resistance wire and the flexible strip, as well as the return conductors making up the potentiometer, is reduced to a minimum, the potentiometer is rendered insensitive to a high degree to picking up interference from stray electromagnetic fields which are usually of the alternating variety and which are more or less present in the area within which the device is used.

Figure 5:
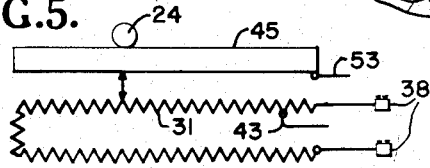
FIG. 5 is a circuit diagram of the device.

When employed as a so-called "microvolt source" to produce voltages in the order of a fraction of one microvolt up to about 0.1 volt, the ends of the resistance wire 43 may be connected to a source of low voltage in a circuit preferably including a milliammeter and a variable resistance. The output voltage from the potentiometer is obtained by establishing external electrical circuits to the zero tap 43 and the end of the flexible strip 45 nearest thereto, FIG. 5.

In operation, the roller is moved to a position intermediate the zero tap and the end of the wire opposite the end of the band connected to the output circuit thereby producing a minute voltage of the reverse character which decreases in magnitude as the roller approaches a position opposite the zero tap, at which point the output voltage is zero, then as the roller progresses along the flexible band toward the opposite end of the resistance wire 33 within slot 29, the output voltage is increased. This output voltage, it will be understood, is independent of thermoelectric couple effects and spurious voltages resulting from coupling with stray magnetic fields of alternating character within which the potentiometer is disposed. The heavier wires employed for maintaining resistance wire 33 and flexible element 45 in tension about the base 11 are preferably composed of a material having a zero coefficient of resistance such, for example, as "Nichrome."

In tests made on the potentiometer device herein disclosed in which the wire 33 comprised a length of "Nichrome" V wire 0.032 inch in diameter and the flexible strip 45 was 0.005 inch thick and composed of the same material, voltages of a fraction of a microvolt up to about 0.1 volt were produced without parasitic thermovoltages which, as is well known, are very disturbing for precise low level work. Furthermore, the output voltage obtained during this test was free from induced voltages from the ambient electromagnetic field which was present. This device has been found to be well suited for measuring very small voltages from strain gages, especially those employed in pressure transducers, and small voltages from thermocouples corresponding to small temperature differences in the order of 1 °C. to be measured within an accuracy of one percent.

Whereas the invention has been described with particularity with reference to an example which gives satisfactory results, it is not so limited as it will be apparent to one skilled in the art, after understanding the invention, that various changes and modifications may be made without departing from the spirit and scope of the invention and it is intended, therefore, in the appended claims to cover all such changes and modifications.

What is claimed as new and desired to be secured by Letters Patent of the United States is:

1. A low noise, low level, precision potentiometer comprising a circular base composed of rigid electrical insulating material and having a first outer cylindrical surface and a second outer cylindrical surface of slightly less diameter adjacent thereto and concentric therewith, said first surface having an annular notch formed therein and said second surface having a pair of annular grooves therein, a length of resistance wire having discrete ends secured to said base and snugly fitted into said grooves, said wire having a diameter less than the depth of one of the grooves and the depth of the other groove being greater than the diameter of the wire, a deformable thin strip of flexible metal slightly less in length than the circumference of said first outer cylindrical surface and having one longitudinal edge formed for engagement with the bottom of said notch, said strip being fitted around said first cylindrical surface in close proximity to but normally not in contact with said wire except at the deformed portion thereof, a plurality of means for establishing external electrical connections to the ends of said wire and said metal strip, a rotatable shaft carried axially by said base and having an arm thereon, and a spring biased roller carried by said arm in rolling engagement with said metal strip and exerting sufficient pressure thereon to deform a relatively small portion of the strip into electrical contact with the length of wire disposed within the group of lesser depth at a point correlative with the instant position of said arm.

2. The device of claim 1 including means for establishing an additional electrical connection to said resistance wire at a point in close adjacency to one end of the length of wire disposed in the groove of lesser depth than the diameter of said wire and engageable by the deformed portion of said strip of flexible metal.

3. The device of claim 2 in which said base is provided with a recess communicating with said pair of grooves, the wire entering the recess from one of said grooves and having a bent portion within the recess for maintaining continuity with the length of wire in the other of said grooves.

4. The device of claim 3 including means secured to said base and engaging said bent portion for maintaining the wire in tension against the bottom of each of said grooves.

5. The device of claim 3 including means secured to the end portions of said strip of flexible metal for continuously applying tension thereto sufficient to maintain the longitudinal edge thereof in snug engagement with the bottom of said notch throughout the length of the metal strip, and means for clamping the tension applying means to said base.

6. A low noise, low level, precision potentiometer comprising a circular base composed of rigid electrical insulating material and having an outer cylindrical surface, a length of resistance wire wrapped around said cylindrical surface, a thin flexible metal band encircling said resistance wire in closely spaced adjacency with respect thereto, said band having an inwardly directed lip formed integrally therewith and extending throughout the length thereof, a circular notch formed circumferentially in said cylindrical surface of less depth than the depth of the lip within which the lip is disposed, means secured to the base and connected to the ends of the band for applying tension thereof sufficient to anchor the lip to the said base thereby to prevent circumferential movement of the band relative to the base, a roller supported for rotation about the axis of said base and moveable along said band, means for pressing the roller against the band and thereby deforming the band sufficiently to engage said wire at a point directly beneath the roller, and means for establishing an external circuit to said band and to said resistance wire.

7. The device of claim 6 in which the means for establishing an electrical circuit to said wire includes a second length of resistance wire formed continuously therewith and carried by the base in closely spaced relation thereto in such manner as to reduce the interference picked up by the device from a stray electromagnetic field.

8. The device of claim 6 in which the resistance wire and metal band are each composed of metal possessing the same resistance characteristics over a temperature range whereby a thermoelectric couple effect at the point of mutual contact is prevented.

References Cited in the file of this patent

UNITED STATES PATENTS

| | | |
|---|---|---|
| 1,704,154 | Stoekle | Mar. 5, 1929 |
| 1,793,090 | Hite | Feb. 17, 1931 |
| 2,007,462 | Stoekle | July 9, 1935 |
| 2,457,814 | Gordy | Jan. 4, 1949 |